United States Patent
Date et al.

(10) Patent No.: US 7,522,640 B2
(45) Date of Patent: Apr. 21, 2009

(54) METHOD OF AVOIDING SYNCHRONIZATION BETWEEN COMMUNICATING NODES

(75) Inventors: Masaaki Date, Osaka (JP); Yukihiro Morita, Saitama (JP); Hisaaki Tanaka, Tokyo (JP)

(73) Assignees: Oki Electric Industry Co., Ltd., Tokyo (JP); Campuscreate, Co., Ltd., Tokyo (JP)

( * ) Notice: Subject to any disclaimer, the term of this patent is extended or adjusted under 35 U.S.C. 154(b) by 756 days.

(21) Appl. No.: 10/939,489

(22) Filed: Sep. 14, 2004

(65) Prior Publication Data

US 2005/0190796 A1 Sep. 1, 2005

(30) Foreign Application Priority Data

Sep. 19, 2003 (JP) .............................. 2003-328530

(51) Int. Cl.
*H04L 12/50* (2006.01)
*H04L 7/02* (2006.01)
*H03D 13/00* (2006.01)

(52) U.S. Cl. ...................................... 370/507; 375/356

(58) Field of Classification Search ......... 370/503–520, 370/533; 375/239, 241, 242, 256, 259, 260, 375/340, 342, 352, 353, 354, 356, 362, 371, 375/373

See application file for complete search history.

(56) References Cited

U.S. PATENT DOCUMENTS

| 6,888,819 B1 * | 5/2005 | Mushkin et al. ............. 370/350 |
| 7,460,631 B2 * | 12/2008 | Date et al. .................. 375/373 |
| 2002/0073086 A1 * | 6/2002 | Thompson et al. ............. 707/10 |
| 2002/0159130 A1 * | 10/2002 | Sakano et al. ............... 359/326 |
| 2003/0063619 A1 | 4/2003 | Montano et al. |
| 2003/0099218 A1 * | 5/2003 | Tillotson .................... 370/337 |
| 2003/0174779 A1 * | 9/2003 | Sugaya et al. ............... 375/259 |
| 2004/0233852 A1 * | 11/2004 | Ochi et al. .................. 370/242 |
| 2005/0195771 A1 * | 9/2005 | Matsunaga et al. .......... 370/336 |
| 2005/0195827 A1 * | 9/2005 | Yao et al. ................. 370/395.4 |
| 2006/0114840 A1 * | 6/2006 | Date et al. .................. 370/254 |

FOREIGN PATENT DOCUMENTS

| JP | 07143558 | 6/1995 |
| JP | 2002-359551 | 12/2002 |
| WO | WO-2004102887 | 11/2004 |

OTHER PUBLICATIONS

Waiyaresu LAN Akitekucha (Wireless LAN Architecture) edited by Matsushita et al., Kyoritsu Shuppan, 1996, pp. 47-71.
Floyd, S., and Jacobson, V., "The Synchronization of Periodic Routing Messages", IEEE/ACM Transactions on Networking, vol. 2, pp. 122-136, Apr. 1994.
Hartwich et al., Timing in TTCAN Network, 2002, http://web.archive.org/web/20020306003128/http://www.can-cia.de/can/ttcan/.

* cited by examiner

*Primary Examiner*—Chi H Pham
*Assistant Examiner*—Ahmed Elallam
(74) *Attorney, Agent, or Firm*—Rabin & Berdo, P.C.

(57) ABSTRACT

Communicating nodes in a network exchange state variable signals indicating the timing of periodic operations performed at the nodes. Each node autonomously controls the timing of its periodic operation so as to distance the timing from the timing of the periodic operations performed at other nodes. If the periodic operations include data transmission, this arrangement enables the nodes to avoid data collisions. The nodes can also adapt autonomously to changing conditions such as changing priority levels and the addition and removal of nodes.

21 Claims, 10 Drawing Sheets

METHOD OF AVOIDING SYNCHRONIZATION BETWEEN COMMUNICATING NODES

BACKGROUND OF THE INVENTION

1. Field of the Invention

The present invention relates to a system such as, for example, a sensor network, a mobile communication network, or a local area network (LAN) having a plurality of communicating nodes. More particularly, the invention relates to the avoidance of unwanted synchronization between nodes, and the avoidance of collisions between transmissions from different nodes.

2. Description of the Related Art

The nodes of concern in the present invention are intelligent devices such as computers, personal digital assistants (PDAs), mobile telephones, or so-called smart sensors, having computational capabilities as well as communication capabilities. Networks of such nodes have become widespread.

In a wireless network, since the nodes share a common communication medium, sometimes referred to as an air interface, they face a problem of collisions between transmissions from different nodes. Two well-known solutions to this problem are time division multiple access (TDMA), in which a central server assigns different time slots to the nodes, and carrier sense multiple access with collision avoidance (CSMA/CA), in which there is no central server but each node checks whether other nodes are transmitting before transmitting itself, detects collisions during transmission, and retransmits at a random time after a collision.

Wired networks such as local area networks may also have a common transmission medium such as a shared cable, with the attendant problem of collisions. The widely used Ethernet LAN communication system has adopted a solution known as carrier sense multiple access with collision detection (CSMA/CD), which is similar to CSMA/CA, except that collisions are detected from an increase in the direct-current component on the cable.

The above solutions are not entirely satisfactory. In the TDMA system, if the central server fails, all of the nodes under its control lose the capability to communicate. Furthermore, when nodes are added or removed, or when a node fails, runs out of power, or is moved to another location, the central server must discover the altered situation and reassign the time slots. This is generally a complex process, and is difficult to carry out rapidly when there are many nodes generating traffic at once. In the CSMA/CA and CSMA/CD systems, as the number of nodes generating traffic increases, so does the amount of overhead included in the traffic, causing an unavoidable loss of communication efficiency.

Transmission collisions, which occur when two nodes transmit simultaneously on the same communication medium, are just one example of the more general problem of unwanted synchronization between nodes. Another well-known example is the periodic transmission of routing information by routers in a network such as the Internet. Even though the router nodes are interconnected by separate cables, if they become synchronized and all transmit routing information at the same times, the network becomes overloaded at these times and communication may be delayed, or data may be lost. This type of synchronization has been shown to occur as an unwanted by-product of almost any type of interaction among nodes.

SUMMARY OF THE INVENTION

An object of the present invention is to provide a method of avoiding collisions in a communication system by autonomous control of the communicating nodes.

Another object of the invention is to enable the nodes to adjust flexibly and autonomously to changing conditions in the communication system.

Yet another object is to enable bandwidth to be apportioned flexibly among nodes.

The invention provides a node having a signal communication unit and a timing decision unit. The signal communication unit transmits a first state variable signal to another node and receives a second state variable signal from the other node. The first state variable signal indicates a first operating timing of the first node; the second state variable signal indicates a second operating timing of the second node. The timing decision unit causes a periodic operation to take place in the first node at a timing responsive to the second state variable signal, and generates the first state variable signal so that the first operating timing is related to the timing of the periodic operation. The timing decision unit adjusts the timing of the periodic operation so that the first operating timing and the second operating timing are mutually distanced from each other, e.g., mutually out of phase.

The invention also provides a machine-readable medium storing a program for controlling the invented node.

The invention further provides a method of controlling a first node and a second node in a network. In this method, a first state variable signal is transmitted from the first node to the second node, indicating a first timing related to a first periodic operation performed at the first node. A second state variable signal is transmitted from the second node to the first node, indicating a second timing related to a second periodic operation performed at the second node. The first periodic operation is controlled autonomously at the first node so as to distance the first timing from the second timing. The second periodic operation is controlled autonomously at the second node so as to distance the second timing from the first timing.

The first and second periodic operations may include data transmission, in which case, by distancing the first and second timings, the nodes can avoid collisions. Alternatively, the first and second periodic operations may be mechanical operations, control operations, data acquisition operations, or internal operations such as the performance of a computational task or the generation of an internal timing signal. Transmission of the first and second state variable signals may also constitute the first and second periodic operations.

If further nodes are added to the network, the nodes can adapt to the changed conditions autonomously by receiving further state variable signals from the added nodes. Each node adjusts the timing of its own periodic operation so as to distance the timing from the timings of periodic operations performed at the other nodes.

Each node may perform its periodic operation at a basic rate determined by the processing capability of the node, the priority of data to be transmitted by the node, or other factors. If the periodic operation involves data transmission, then data transmission takes place in time slots that are apportioned according to the node's processing capability, priority, or other factors.

DETAILED DESCRIPTION OF THE INVENTION

Figure 1:
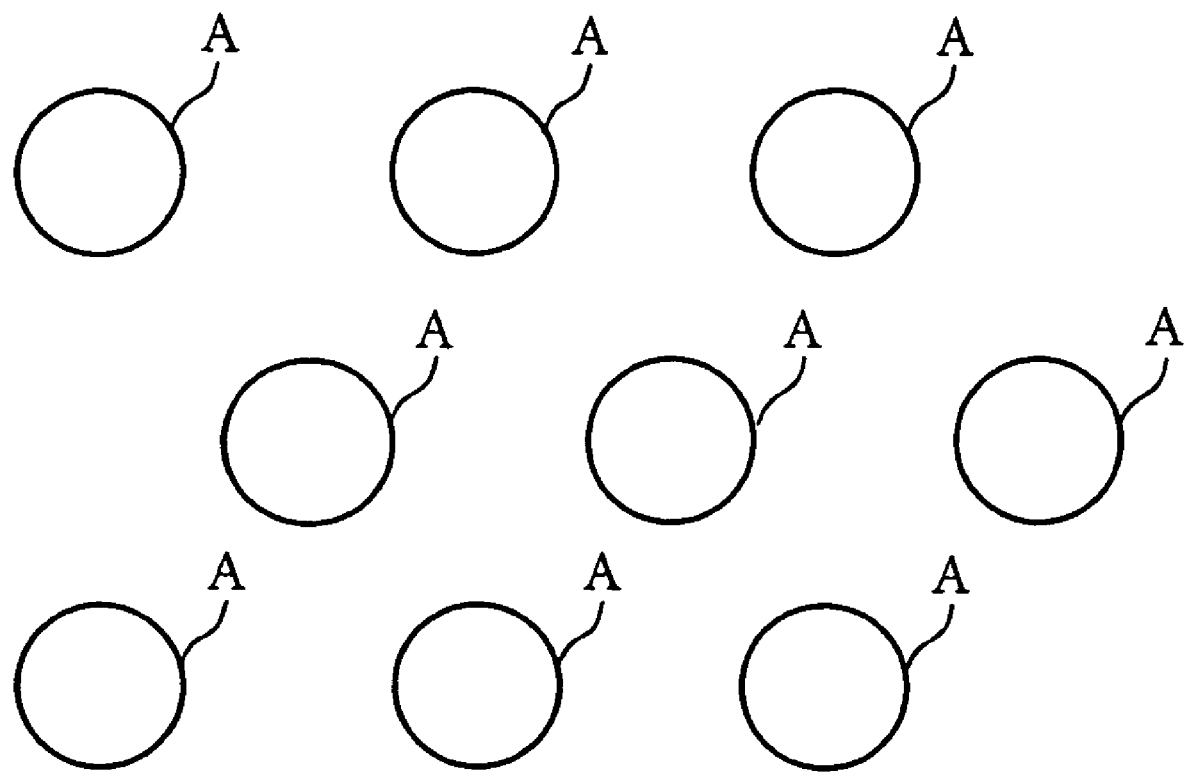
FIG. 1 illustrates a plurality of nodes in a wireless communication system.

Embodiments of the invention will now be described with reference to the attached drawings, in which like elements are indicated by like reference characters.

First Embodiment

Referring to FIG. 1, a first embodiment of the invention comprises a plurality of spatially distributed nodes A that exchange data by wireless communication.

Figure 2:
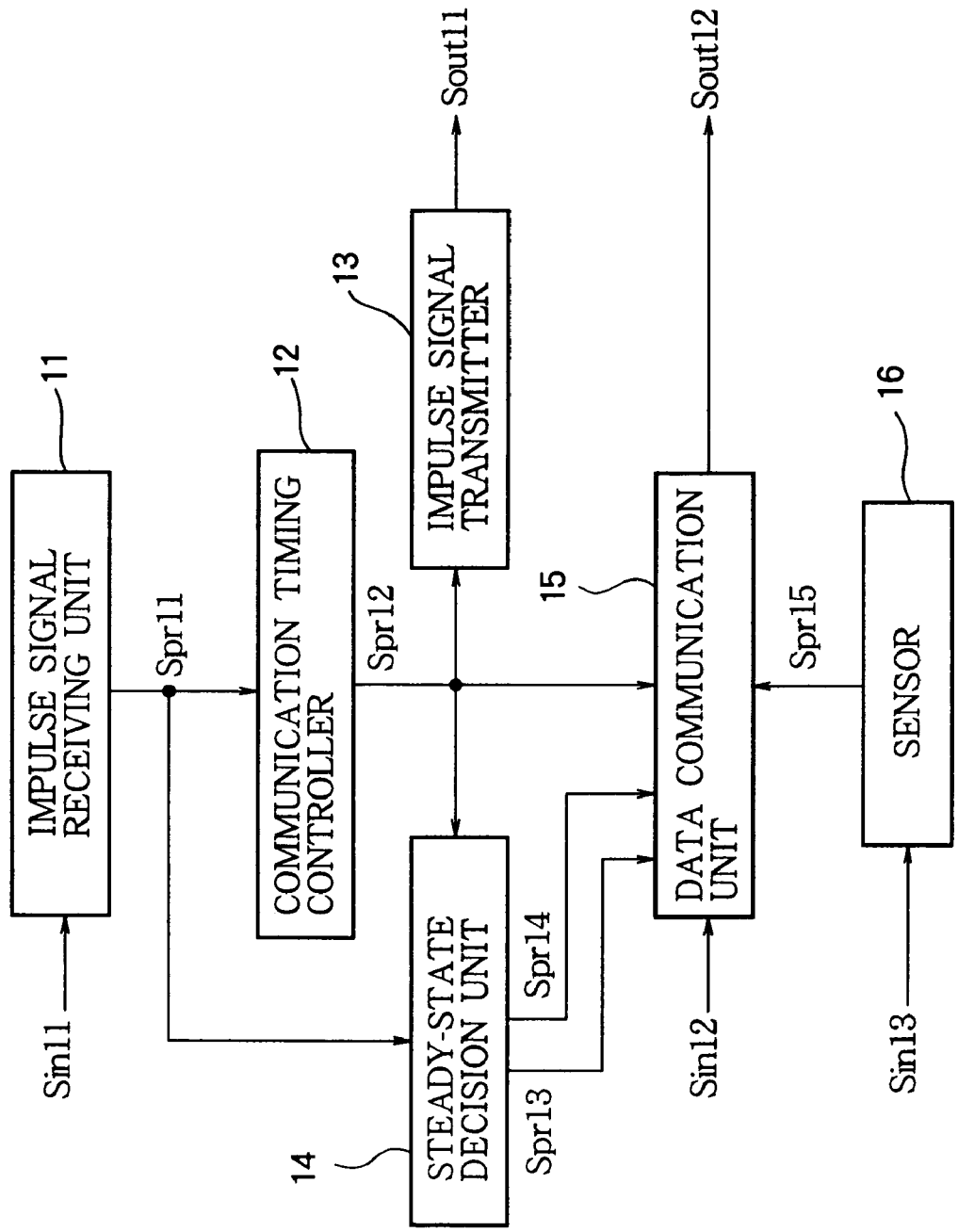
FIG. 2 is a block diagram showing the internal structure of a node according to a first embodiment of the present invention.

As shown in FIG. 2, each node A comprises an impulse signal receiving unit 11, a communication timing controller 12, an impulse signal transmitter 13, a steady-state decision unit 14, a data communication unit 15, and a sensor 16. Each node A also has a power supply (not shown) for supplying electrical power to these components.

The impulse signal receiving unit 11 receives an input impulse signal Sin11 and outputs a received impulse signal Spr11 to the communication timing controller 12 and the steady-state decision unit 14.

The communication timing controller 12 generates a phase signal Spr12 and outputs it to the impulse signal transmitter 13, steady-state decision unit 14, and data communication unit 15.

The impulse signal transmitter 13 outputs an output impulse signal Sout11 to the outside world, that is, to other nodes.

The steady-state decision unit 14 generates a steady-state decision signal Spr13 and a slot signal Spr14 and outputs them to the data communication unit 15.

The data communication unit 15 receives observation data Spr15 from the sensor 16, receives an input data signal Sin12 from the outside world (other nodes), and outputs an output data signal Sout12 to the outside world.

The sensor 16 receives environmental information Sin13 from the outside world and outputs observation data Spr15 to the data communication unit 15. The environmental information Sin13 is information about the physical environment of the node, such as the ambient temperature, sound level, level of vibration or seismic magnitude, concentration of a chemical substance, or the like.

The output impulse signal Sout11 and output data signal Sout12 shown in FIG. 2 are baseband signals which are modulated onto a high-frequency carrier signal before being transmitted. The impulse signal transmission means 13 and data communication means 15 in the first embodiment share the same carrier frequency and may therefore share the same circuits (not shown) for generating and modulating the carrier signal. Similarly, the impulse signal receiving means 11 and data communication means 15 may share common circuits for demodulating a high-frequency received carrier signal to obtain the input impulse signal Sin11 and input data signal Sin12.

The impulse signal receiving unit 11 and impulse signal transmitter 13 constitute a state variable signal communication unit. The communication timing controller 12 and impulse signal transmitter 13 constitute a timing decision unit. The state-variable signals are the input impulse signal Sin11 and output impulse signal Sout11. The period operation performed in the first embodiment is the transmission of the output impulse signal Sout11. This periodic operation also establishes an internal timing, referred to below as a time slot, for transmission of the output data signal Sout12, but the output data signal Sout12 is not necessarily transmitted in every time slot.

Each of the constituent elements shown above may be a separate hardware module, but some of the elements, such as the communication timing controller 12, may be implemented as software executed by a general-purpose computing device.

The nodes are not limited to the internal structure shown in FIG. 2; various modifications are possible. For example, elements shown as separate functional blocks in FIG. 2 may be combined into a single hardware or software block, or an element shown as a single functional block may be divided into a plurality of hardware or software blocks. The functional components of a single node may be disposed at physically separate locations.

The functions performed by these units will be described in more detail in the following description of the operation of the first embodiment, which will be based on the flowchart in FIG. 3.

Figure 3:
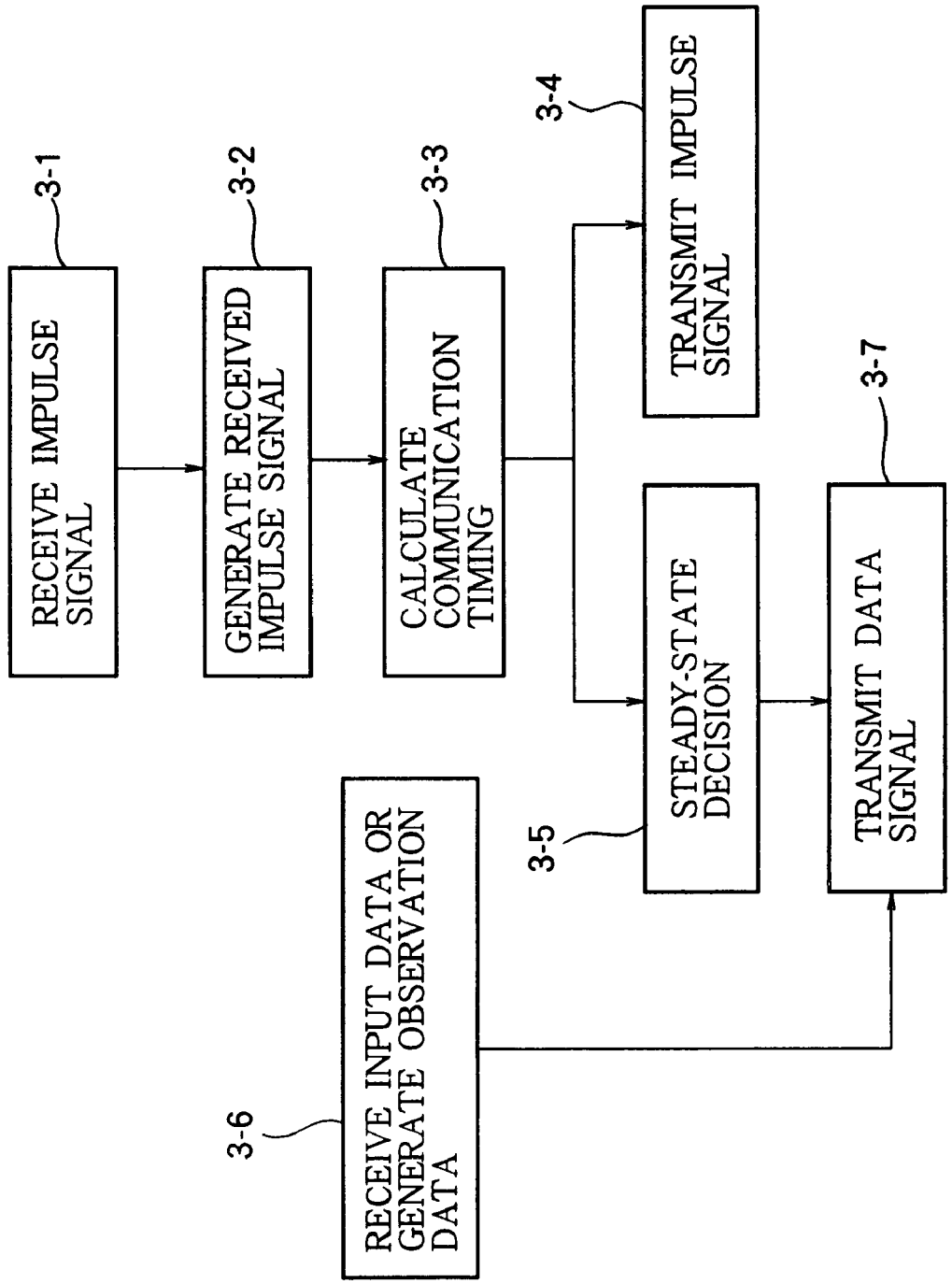
FIG. 3 is a flowchart illustrating the communication method according to the first embodiment.

In step 3-1 in FIG. 3, the impulse signal receiving unit 11 receives an output impulse signal Sout11 transmitted by a neighboring node as an input impulse signal Sin11. 'Neighboring' means that, for example, the node is within radio transmission range and is in a communication-enabled state. The input impulse signal Sin11 is a timing signal representing timing information but not carrying any data. Ideally the input impulse signal Sin11 is a delta-function signal comprising a pulse of infinite height and infinitesimal width, but in practice the pulse has, for example, a Gaussian waveshape with finite height and positive width.

In step 3-2, the impulse signal receiving unit 11 reshapes the received signal to generate the received impulse signal Spr11. The received signal can be reshaped by using a low-pass filter to remove noise. Alternatively, since the impulse signals exchanged between the nodes have a uniform waveshape defined by a predetermined mathematical function, instead of reshaping the received signal, the impulse signal receiving unit 11 can regenerate a timing signal synchronized with the reception of the input impulse signal Sin11 and having the intended waveshape, and use the regenerated signal as the received impulse signal Spr11.

In step 3-3, the communication timing controller 12 performs calculations to determine the timing of transmission of the output impulse signal Sout11. More specifically, the communication timing controller 12 advances the phase of a state variable $\theta_i(t)$ that models nonlinear oscillation by cycling in the range from zero to $2\pi$. The output impulse signal Sout11 is transmitted when the state variable has a specific phase value $\alpha$, such as zero radians ($\alpha=0$). The rate at which the phase of the state variable $\theta_i(t)$ advances is controlled by, for example, the differential equation (1) below.

This equation (1) is essentially a rule for generating local variations in the basic period of the nonlinear oscillation at the i-th node in response to received impulse signals Spr11 from neighboring nodes. The variable t represents continuous time, and $\omega$ is a natural angular frequency parameter expressing the basic oscillation period, that is, the basic rhythm with which the periodic operation is performed at the node. It will be assumed in this embodiment that $\omega$ has a uniform predetermined value throughout the system. The function $P_k(t)$ expresses the value at time t of the received impulse signal Spr11 obtained by reshaping or regenerating the input impulse signal Sin11 received from neighboring node k (k=1 to N). N is the total number of neighboring nodes within spatial receiving range, capable of producing a received impulse signal Spr11. The function $R(\theta_i(t), \sigma(t))$ is a phase response function that determines how the basic period or rhythm is varied in response to the received impulse signals Spr11.

$$d\theta_i(t)/dt = \omega + \sum_{k=1}^{N} P_k(t) \cdot R(\theta_i(t), \sigma(t)) \quad (1)$$

$$R(\theta_i(t), \sigma(t)) = \sin(\theta_i(t) + \sigma(t))$$

$$\sigma(t) = \pi + \phi(t)$$

$\theta_i(t)$: phase signal of node i
$\omega$: natural angular frequency parameter
$P_k(t)$: received impulse signal received from node k
$R(\theta_i(t), \sigma(t))$: phase response function
$\phi(t)$: random noise function In known art dealing with coupled oscillating systems such as the above in which a plurality of interacting nodes exhibit some type of internal nonlinear oscillating behavior, many ways have been devised of achieving desired effects by shaping the nonlinearity of the oscillating behavior so as to bring neighboring nodes into phase, so that they oscillate in step with one another. Examples can be found in Japanese Unexamined Patent Application Publication No. 2002-359551.

The present invention takes the opposite approach: it shapes the nonlinearity of the oscillating behavior so as to force neighboring nodes out of step with each other, so that, for example, their oscillations are mutually $\pi$ radians (180°) out of phase. Keeping neighboring nodes in the present embodiment out of phase with each other ensures that their transmitted impulse signals Sout11 do not collide and that, when transmitted, their output data signals Sout12 do not collide either.

In the phase response function $R(\theta_i(t), \sigma(t))$, the term $\sigma(t)$ is the sum of a constant term $\pi$ and a random function $\phi(t)$. The constant term $\pi$ attempts to bring neighboring nodes into complementary phase with each other by distancing the transmission timings of one node as far as possible from the transmission timings of another node. The random function $\phi(t)$ gives the nonlinear characteristic a random variability by generating noise (random values) according to, for example, a Gaussian probability distribution with a mean value of zero and a standard deviation that can be selected on the basis of experiments.

The random variability is added to keep the system from becoming trapped in a locally stable state (local solution) other than the desired stable state (optimal solution) in which the transmission timings of the output impulse signal Sout11 at neighboring nodes are appropriately out of phase with each other. In a coupled oscillating system there are generally a plurality of stable states (local solutions) other than the optimal solution. Random variability is introduced as a means of jogging the system out of a local solution so that it can reach the optimal solution.

The phase response function $R(\theta_i(t), \sigma(t))$ in equation (1) above is a sine function, but the invention is not limited to the use of a sine function, and the constant term is not limited to $\pi$. The constant term may be any constant $\lambda$ other than zero or an even multiple of $\pi$ (e.g., any value in the range $0<\lambda<2\pi$). If a constant other than $\pi$ is used, the result will be that neighboring nodes attempt to assume different but not reverse phases.

Although the above equation (1) takes the sum of the received impulse signals Spr11 received from a plurality of neighboring nodes k, it is also possible to process the received impulse signals Spr11 one by one by removing the summation symbol ($\Sigma$) from the equation.

The calculations required by equation (1) can be carried out by software using well-known numerical analysis methods such as the Runge-Kutta method. (For a Japanese description of the Runge-Kutta method, see UNIX Wakusuteishon ni yoru Kagaku Gijutsu Keisan Handobukku-Kiso-hen C-gengo ban (Handbook of Scientific and Engineering Computation on UNIX Workstations—Basic C Language Edition) by Hayato Togawa, published by Saiensu Co.) Alternatively, the calculations can be carried out by dedicated hardware.

The communication timing controller 12 calculates the phase $\theta_i(t)$ from equation (1) for successive values of the time parameter t, and supplies the result to the impulse signal transmitter 13, steady-state decision unit 14, and data communication unit 15 as the phase signal Spr12. The impulse signal transmitter 13, steady-state decision unit 14, and data communication unit 15 take various actions on the basis of the phase signal Spr12, as described below.

The invention is not restricted to the use of equation (1) or to the use of state variable signals indicating phase. A state variable signal may be any signal indicating the state of a variable that expresses an operating state or operating timing of a node. For example, instead of phase, the state variable signal may express displacement, and the underlying nonlinear oscillation model may not be the locally varied harmonic oscillator described by equation (1) but any other type of nonlinear oscillation, including disorderly or chaotic oscillation.

The above computational operations will be explained in further detail with reference to drawings that show how the phases of two or three nodes are forced apart over time.

Figure 4A:
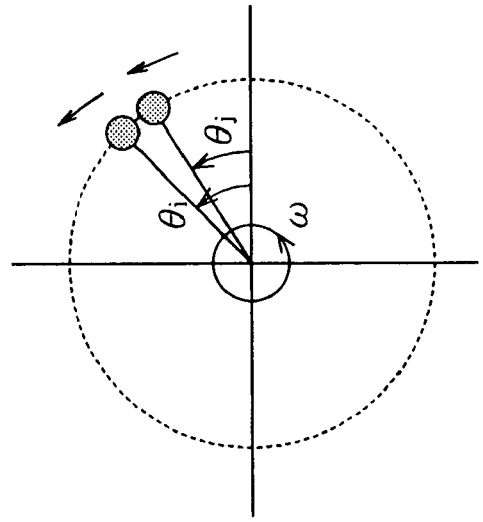
FIG. 4A illustrates an initial state during communication between two neighboring nodes.
Figure 4B:
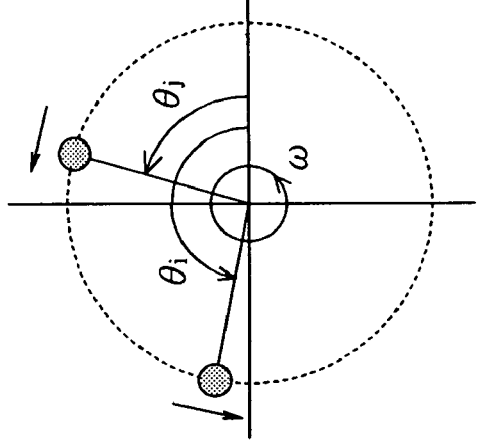
FIG. 4B illustrates a transitional state during communication between the two neighboring nodes.
Figure 4C:
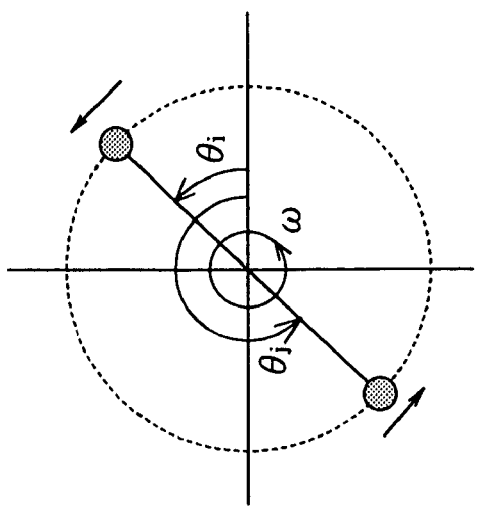
FIG. 4C illustrates the steady state during communication between the two neighboring nodes.

FIGS. 4A, 4B, and 4C illustrate this process when there is just one neighboring node j near the node of interest i. FIG. 4A shows an exemplary initial state, when the system starts operating. Nonlinear oscillation is modeled by the motion of the two point masses rotating around a circle, expressing the timing phase of these nodes i, j. If the rotational motion of a point mass is projected onto the vertical axis or horizontal axis, the motion of the projected point exhibits harmonic nonlinear oscillation. From equation (1), a nonlinear characteristic operating on the two mass points attempts to bring them into complementary phases, so with elapse of time the initial state in FIG. 4A passes through a transitional state such as the one in FIG. 4B and finally settles into the steady state shown in FIG. 4C.

The two point masses rotate with a basic angular velocity (equivalent to the basic rate of transitions in the operating states of their nodes) given by the natural angular frequency parameter $\omega$. The point masses interact by transmission and reception of output impulse signals Sout11, alter (quicken or slow) their angular velocities as a result of the interaction, and reach a steady state in which a complementary phase relationship is maintained. This process can be understood as operating by mutual repulsion of the two point masses as they rotate.

Figure 5A:
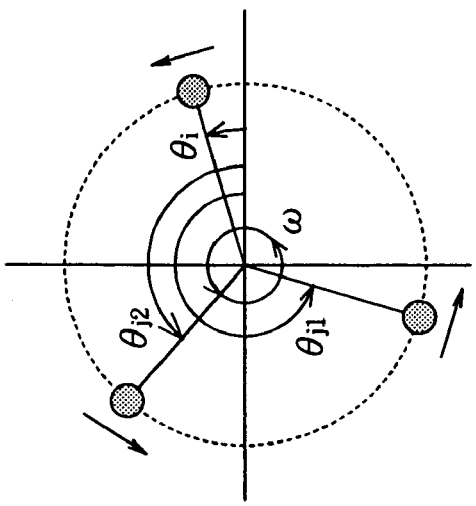
FIG. 5A illustrates an initial state during communication among three neighboring nodes.
Figure 5B:
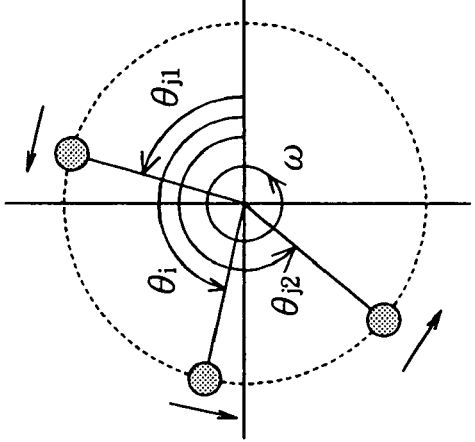
FIG. 5B illustrates a transitional state during communication among the three neighboring nodes.
Figure 5C:
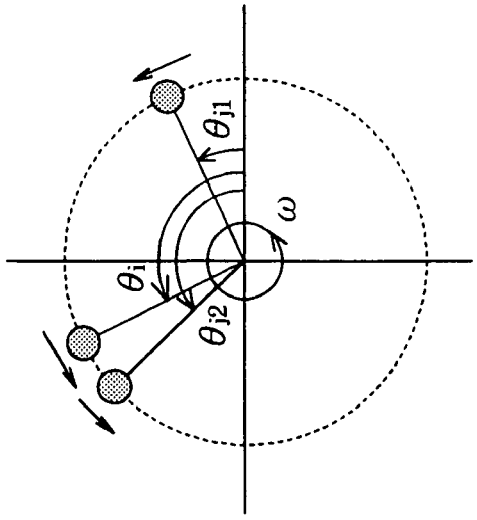
FIG. 5C illustrates the steady state during communication among the three neighboring nodes.

In FIGS. 5A, 5B, and 5C there are two neighboring nodes j1 and j2 near the node of interest i. FIG. 5A shows an exemplary initial state, FIG. 5B shows a transitional state, and FIG. 5C shows the steady state in which the phases at the three nodes are mutually separated by $2\pi/3$ radians. This state can also be thought of as being reached by mutual repulsion of point masses rotating around a circle. Similar operations occur when the number of neighboring nodes is three or more.

If the number of neighboring nodes changes during the course of system operation, the steady state changes adaptively. Assume, for example, that there is now one node neighboring the node of interest, and that a stable phase relationship has been established as in FIG. 4C. Then assume that one new neighboring node is added. The stability of the phase relationship is destroyed, but after passing through a transitional state, the system assumes a new steady state in which there are two neighboring nodes, as in FIG. 5C. Similar adaptation occurs when two or more new neighboring nodes are added, or when a neighboring node is removed or stops functioning. The first embodiment enables all of the nodes constituting the system to form stable phase relationships with their neighboring nodes and adapt to changes flexibly and autonomously.

The operation of the first embodiment can be described in more general terms as follows. Each node generates an internal state variable signal according to a pair of rules, performs a periodic operation at times indicated by the state variable signal, and informs neighboring nodes of the value of its internal state variable by transmitting an output state variable signal from time to time. In the first embodiment, the internal state variable signal is the phase signal Spr12, and the output state variable signal is the output impulse signal Sout11.

The first rule by which the internal state variable signal is generated determines the basic rate at which the operation is performed. In the first embodiment, this rule is given by the natural angular frequency parameter $\omega$.

The second rule varies the rate at which the operation is performed, in response to state variable information received from neighboring nodes. This rule operates repulsively by driving the internal state of the node away from the internal states of the neighboring nodes. In the first embodiment, the second rule is given by equation (1).

The second rule operates locally; that is, each node controls its own internal state and timing autonomously.

The first rule may be either local or global. In the first embodiment, it is assumed that the first rule is global and constant, i.e., that all nodes have the same constant natural angular frequency parameter $\omega$, but in the general case, different nodes may operate at different basic rates. For example, the basic rate may vary with the physical location of the node. The basic rates at some nodes may be integer multiples of the basic rates at other nodes. Alternatively, the basic rates of the nodes may all be close to a central value, but may be distributed randomly around the central value according to, for example, a Gaussian probability distribution. The basic rate of a node may also vary over time.

The first and second rules may be based on various nonlinear oscillation models. It is not necessary to model the oscillating mechanism or phenomena exactly; a simplified or abstracted model may be used.

Referring again to FIG. 3, in step 3-4, the impulse signal transmitter 13 transmits the output impulse signal Sout11 according to the phase signal Spr12. That is, it transmits the output impulse signal $P_i(t)$ when the phase signal Spr12 takes on a specific value $\alpha$:

$$\theta_i(t)=\alpha \ (0\leq\alpha\leq 2\pi)$$

The output impulse signal Sout11 or $P_i(t)$, like the above input impulse signal Sin11, is a timing signal having, for example, a Gaussian waveshape. A particular value of $\alpha$ is uniformly set for the entire system. No generality is lost by assuming that $\alpha=0$, so in the following distribution it will be assumed that $\alpha=0$ uniformly throughout the system.

In step 3-5, the steady-state decision unit 14 decides whether the transmission timings of the output impulse signals Sout11 at its own node and neighboring nodes are in a transitional state or the steady state. In the steady state, the transmission timings of the output impulse signal Sout11 at these nodes are stabilized in an appropriate non-colliding temporal relationship. The steady-state decision unit 14 observes the timing of the received impulse signal Spr11 and output impulse signal Sout11, and decides that they are in the steady state if the timing difference remains temporally constant, or nearly constant. That is, the steady-state decision unit 14 decides any stable timing relationship as the steady state. The steady-state decision can be carried out, for example, as follows.

(a) The value $\beta$ of the phase signal Spr12 at the timing of generation of the received impulse signal Spr11 is observed for one basic period of the phase signal Spr12. Let the values $\beta$ of the phase signal Spr12 obtained as a result of performing the above observation be:

$$\beta_1, \beta_2, \ldots, \beta_N \ (0<\beta_1<\beta_2<\ldots<\beta_N<2\pi)$$

(b) The differences (phase differences) $\Delta$ between adjacent values are calculated from the observed values $\beta$ of the phase signal Spr12.

$$\Delta_1=\beta_1, \Delta_2=\beta_2-\beta_1, \ldots, \Delta_N=\beta_N-\beta_{N-1}$$

(c) Processes (a) and (b) above are carried out at intervals of one period of the phase signal Spr12 and the rate of change $\gamma$ (differences) in the phase difference $\Delta$ between adjacent periods are calculated.

$$\gamma_1=\Delta_1(\tau+1)-\Delta_1(\tau), \gamma_2=\Delta_2(\tau+1)-\Delta_2(\tau), \ldots, \gamma_N=\Delta_N(\tau+1)-\Delta_N(\tau)$$

where τ indicates discrete time in units of one period of the phase signal Spr12.

The steady state is recognized when the above rates of change γ are all smaller than a predetermined value ε.

$$\gamma_1 < \epsilon, \gamma_2 < \epsilon, \ldots, \gamma_N < \epsilon$$

In the example above, the steady state is recognized on the basis of the rate of change in phase difference Δ over two periods. It is also possible, however, to make the steady state decision according to whether the decision condition $$\gamma_1 < \epsilon, \gamma_2 < \epsilon, \ldots, \gamma_N < \epsilon$$

is satisfied over M periods (where M is an integer greater than two). The larger the value of M is, the more stable the state must be in order for the steady-state decision unit 14 to decide that the steady state has been reached.

In the example above, the steady-state decision is made on the basis of all received impulse signals Spr11 received in each period of the phase signal Spr12, but the decision may be based on only some of the received impulse signals Spr11.

The steady-state decision unit 14 outputs the steady-state decision signal Spr13 indicating the decision result and the slot signal Spr14 to the data communication unit 15. The slot signal Spr14 gives the value $\beta_1$ of the phase signal Spr12 at the first received impulse signal Spr11 following phase zero. The steady-state decision signal Spr13 and slot signal Spr14 are output at intervals equal to the period of the phase signal Spr12.

In step 3-6, the sensor 16 senses a property of the physical environment of the node, such as temperature, sound intensity, vibration, chemical concentration, or any other measurable property. The sensed property acts as an input signal Sin, from which the sensor 16 generates observation data Spr15. The sensor 16 sends the observation data Spr15 to the data communication unit 15. The data communication unit 15 also receives the output data signals Sout12 transmitted by neighboring nodes as input data signals Sin12.

In step 3-7, the data communication unit 15 transmits the observation data Spr15 or the input data signal Sin12 (or both) to other nodes as the output data signal Sout12. The output data signal Sout12 is transmitted when the steady-state decision signal Spr13 indicates that the steady state has been recognized, and is not transmitted when the steady-state decision signal Spr13 indicates a transitional state. The output data signal Sout12 and output impulse signal Sout11 are transmitted in the same frequency band. The output data signal Sout12 is transmitted in a time slot (time interval) described below.

The time slot starts at a timing following the transmission of the output impulse signal Sout11, and ends at a timing preceding the generation of the closest received impulse signal Spr11. If the output impulse signal Sout11 is transmitted at phase zero, the output data signal Sout12 is transmitted in a time slot in which the phase $\theta_i(t)$ indicated by the phase signal Spr12 satisfies the following condition.

$$\delta_1 < \theta_i(t) < \beta_1 - \delta_2$$

The parameter $\delta_1$ corresponds to the space of time required for the transmission of the output impulse signal Sout11. The parameter $\delta_2$ indicates the space of time that must be allowed between the termination of transmission of the output data signal Sout12 and the generation of the closest following received impulse signal Spr11 is generated. Both parameters have experimentally determined values, expressible in radians. The rate at which sensor observations are made may be equal to, faster than, or slower than the basic rate represented by the natural angular frequency parameter ω. If necessary, a single time slot may be used to transmit a plurality of sensor observations, or data from a single sensor observation may be transmitted over a series of consecutive time slots. In some time slots, no observation data may be transmitted.

If each node transmits data in time slots satisfying the conditions above, neighboring nodes can share the same frequency band and still avoid collisions of transmitted data.

The transmitted signal strength (signal propagation range) D12 of the output data signal Sout12 is controlled independently of the transmitted signal strength (signal propagation range) D11 of the output impulse signal Sout11. The two signal strengths may have a predetermined relationship: for example, D11 may be twice D12. Alternatively, the relationship may be varied adaptively. An appropriate relationship is one such that any two nodes capable of generating mutually interfering output data signals can also receive each other's output impulse signals and thereby adjust their transmission timing so as to avoid data collisions.

Steps 3-3 to 3-7 in FIG. 3 and can be executed without executing steps 3-1 and 3-2. The communication timing calculations are performed to generate the phase signal Spr12 on a regular basis, regardless of the reception or non-reception of state variable signals from other nodes. If state variable signals are received from other nodes, they will affect the calculations, but if they are not received, the calculations will proceed nevertheless.

In contrast to conventional TDMA systems, in which a centralized server manages all time slot assignments, the present embodiment lets the network nodes determine their own time slot assignments autonomously, on a distributed basis, by mutual interaction among neighboring nodes. Since the present embodiment does not rely on a centralized server, it does not experience the problem of all nodes under the control of a centralized server becoming incapable of communication if the server fails.

In the present embodiment, when nodes are added to or removed from part of the system or when a node fails or moves to another location, the set of nodes affected by the change adapt to the change and readjust their time slots autonomously, while nodes not affected by the change continue data communication without interruption, using their existing time slots.

Because time slots are adjusted locally among neighboring nodes, non-neighboring nodes may transmit data simultaneously. More specifically, nodes with non-overlapping impulse signal propagation ranges may transmit simultaneously to make efficient use of time-slot resources. In the present embodiment, this efficiency is achieved autonomously. If a similar type operation were to be attempted in a system managed by a centralized server, the server would have to keep track of the spatial positional relationships of all nodes and their signal propagation ranges, and would have to modify the time-slot assignments whenever any of these relationships and ranges changed. In a system in which such changes occur frequently, the computational cost of these operations would be high, much additional communication overhead would be necessary, and communication efficiency would suffer accordingly.

In the present embodiment, in contrast, there is no need for complex computations to be carried out by a centralized server, the amount of overhead does not increase even when many nodes generate traffic, and communication efficiency is not lowered as traffic increases. Compared with conventional CSMA/CA systems, the present embodiment offers improvements in the stability, efficiency, adaptability, and cost of data communication.

In a variation of the first embodiment, only nodes that generate data communication traffic transmit the output impulse signal Sout11 (that is, only nodes generating data communication traffic interact with their neighboring nodes). In this case, as some nodes stop generating traffic and other nodes start generating traffic, the time slots are reassigned adaptively so as to make efficient use of communication resources.

In another variation of the first embodiment, the sensor 16 is replaced by another type of device generating data to be transmitted periodically. There is no restriction on the type of data transmitted or the content of the data.

Second Embodiment

Figure 6:
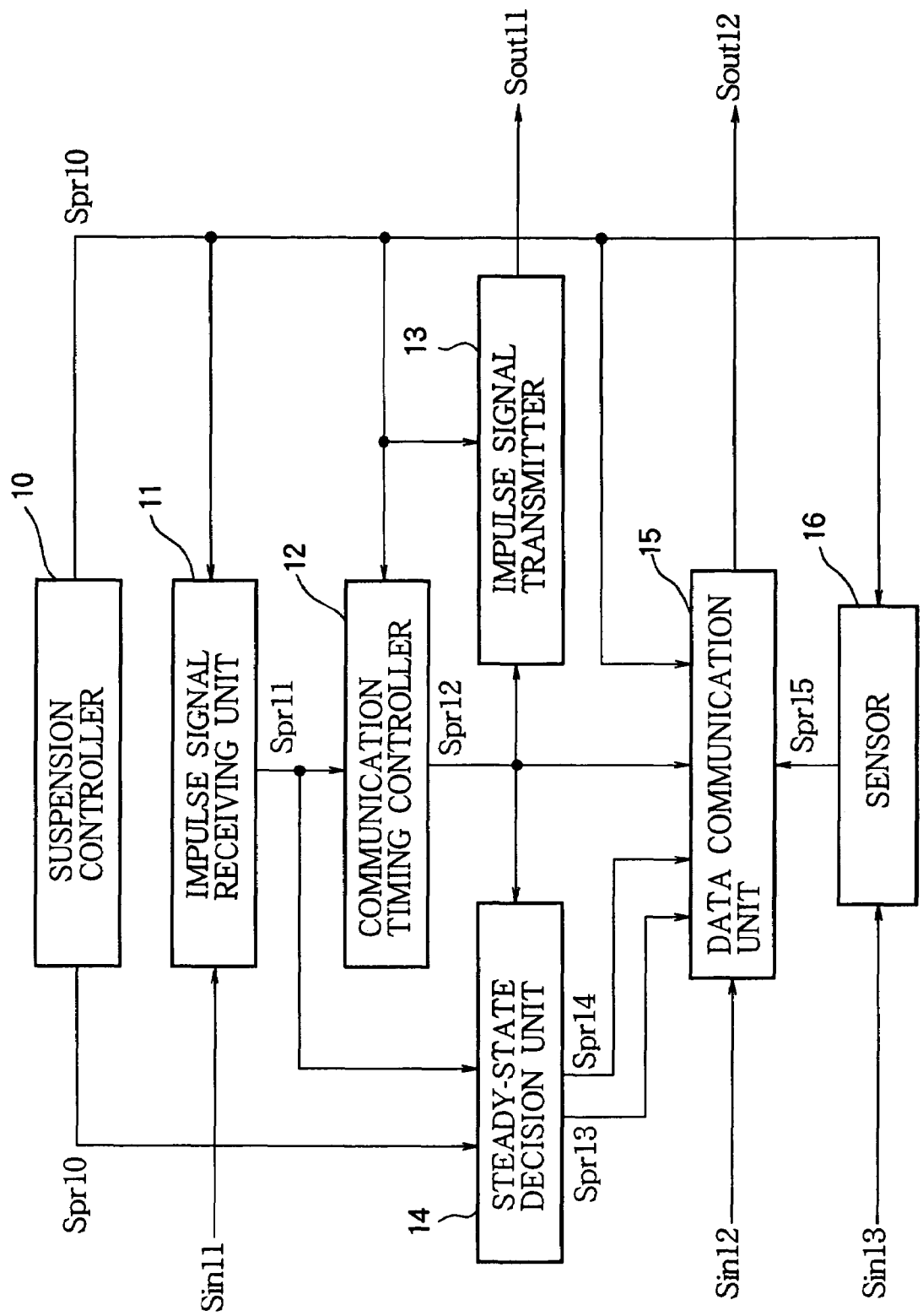
FIG. 6 is a block diagram showing the internal structure of a node according to a second embodiment of the invention.

Next, a node according to a second embodiment of the invention will be described. Referring to FIG. 6, the second embodiment adds a suspension controller 10 to the node structure in the first embodiment. The suspension controller 10 outputs a suspend signal Spr10 to all the other constituent elements of the node, that is, to the impulse signal receiving unit 11, communication timing controller 12, impulse signal transmitter 13, steady-state decision unit 14, data communication unit 15, and sensor 16.

The second embodiment operates in the same way as the first embodiment, except for the following differences.

The suspension controller 10 switches the operation of each other constituent element in the node on and off periodically. The impulse signal receiving unit 11, communication timing controller 12, impulse signal transmitter 13, steady-state decision unit 14, data communication unit 15, and sensor 16 operate when the suspend signal Spr10 is in the on-state, and stop operating when the suspend signal Spr10 is in the off-state. The ratio of on-time to off-time may be a uniform constant ratio a:b (on-time:off-time=a:b where a and b are positive integers), or the ratio may vary from time to time and from node to node. The on-off cycles at different nodes are not synchronized.

The introduction of the suspension controller 10 causes the nodes to cycle between active and inactive states asynchronously. As seen from one node, the other nodes follow active-inactive cycles that are randomly related. Because of the randomness in the active-inactive cycles, the function $\phi(t)$ used to provide random variability in equation (1) in the first embodiment is no longer necessary. Equation (1) can accordingly be simplified as follows.

$$d\theta_i(t)/dt = \omega + \sum_{k=1}^{N} P_k(t) \cdot R(\theta_i(t))$$

$$R(\theta_i(t)) = \sin(\theta_i(t) + \pi)$$

$\theta_i(t)$: phase signal of node i
$\omega$: natural angular frequency parameter
$P_k(t)$: received impulse signal from node k
$R(\theta_i(t))$: phase response function The second embodiment provides the same advantages as the first embodiment and the following additional advantage. In the first embodiment the nodes constituting the system are always active and always consume power. In the second embodiment, however, each node becomes active only intermittently. When a node is inactive, it consumes less power. If the nodes are battery-operated, drain on the batteries is reduced and the operating life of the system can be extended.

Third Embodiment

Figure 7:
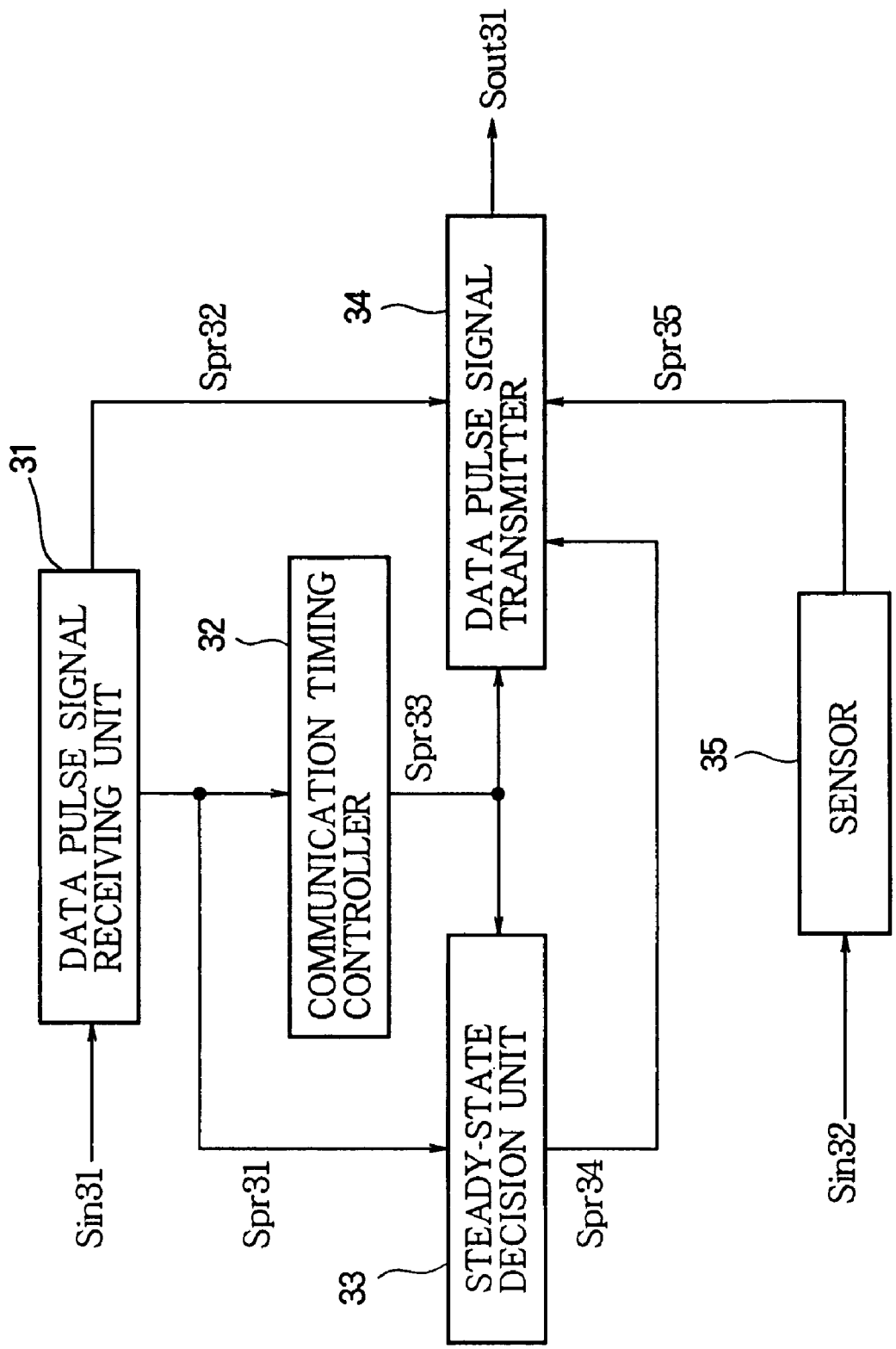
FIG. 7 is a block diagram showing the internal structure of a node according to a third embodiment.

Next, a third embodiment of the present invention will be described. Referring to FIG. 7, a node in the third embodiment comprises a data pulse signal receiving unit 31, a communication timing controller 32, a steady-state decision unit 33, a data pulse signal transmitter 34, and a sensor 35.

The data pulse signal receiving unit 31 receives an input data pulse signal Sin31, outputs a received impulse signal Spr31 to the communication timing controller 32 and steady-state decision unit 33, and outputs a received data signal Spr31 to the data pulse signal transmitter 34. The communication timing controller 32 outputs a phase signal Spr33 to the steady-state decision unit 33 and the data pulse signal transmitter 34. The steady-state decision unit 33 outputs a steady-state decision signal Spr34 to the data pulse signal transmitter 34. The data pulse signal transmitter 34 sends an output data pulse signal Sout31 to the outside world. The sensor 35 inputs environmental information Sin32 and outputs observation data Spr35 to the data pulse signal transmitter 34, operating in the same way as the sensor in the first embodiment.

In the third embodiment, the data pulse signal receiving unit 31 and data pulse signal transmitter 34 function as a state variable signal communication unit. The communication timing controller 32 and data pulse signal transmitter 34 function as a timing decision unit. The data pulse signal transmitter 34 also functions as a data communication unit.

Figure 8:
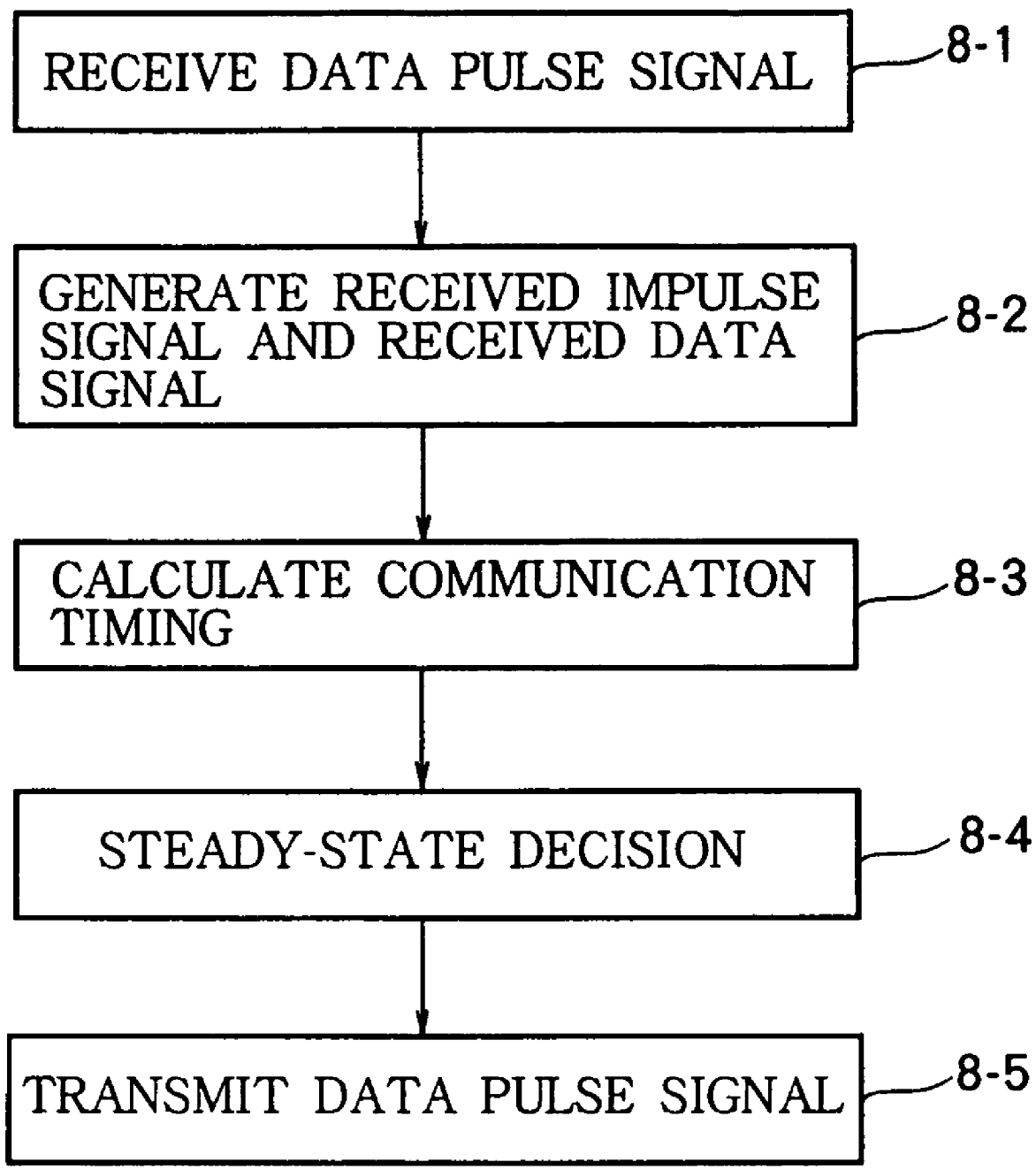
FIG. 8 is a flowchart illustrating a communication method used in the third embodiment.

The operation of the third embodiment will be described with reference to the FIG. 8. Mainly, the operations differing from the first embodiment will be described; descriptions of similar operations will be omitted.

First, in step 8-1 the data pulse signal receiving unit 31 receives a data pulse signal transmitted by a neighboring node (for example, another node within radio transmission range) as an input data pulse signal Sin31. The input data pulse signal Sin31 has sufficient pulse width to enable the pulse to be modulated by a data signal. Prior to modulation, the pulse may be a rectangular pulse, or may have a triangular waveshape, a Gaussian waveshape, or any other suitable waveshape, the same waveshape being used throughout the system. The pulse thus includes both a data component and a timing component, the timing component being represented by the timing of the pulse.

In step 8-2, the data pulse signal receiving unit 31 demodulates the received input data pulse signal Sin31, and separates it into an impulse signal representing the timing component and a data signal representing the data component. The separated impulse signal is output to the communication timing controller 32 and steady-state decision unit 33 as the received impulse signal Spr31. The data component is output to the data pulse signal transmitter 34 as a received data signal Spr32.

In step 8-3, the communication timing controller 32 calculates transmitting timings by the method described in the first embodiment. A repeated description will be omitted.

In step 8-4, the steady-state decision unit 33 makes steady-state decisions as described in the first embodiment, but does not generate the slot signal Spr14 described in the first embodiment.

In step 8-5, if the steady-state decision signal Spr34 indicates that the steady state has been reached, the data pulse signal transmitter 34 modulates the observation data Spr36 received from the sensor 35 or the received data signal Sin32 (or both) onto a pulse signal to generate an output data pulse signal Sout31, and transmits the output data pulse signal Sout31 when the phase signal Spr33 takes on a specific value $\alpha$.

$\theta_i(t)=\alpha \ (0 \leq \alpha < 2\pi)$

If the steady-state decision signal Spr34 indicates a transitional state, the data pulse signal transmitter 34 transmits the pulse signal at the above timing without modulating observation data onto the pulse waveform.

In comparison with the first embodiment, which transmits separate data and timing signals, the third embodiment includes both data and timing information in the same output data pulse signal. In the third embodiment, accordingly, it is only necessary to avoid collisions between these data pulse signals; it is not necessary to avoid collisions between separate data signals. This enables data communication to remain relatively stable even when the number of mutually interacting nodes is extremely large and each node can be allotted only a very brief time for data transmission.

In the third embodiment, as in the first embodiment, even when nodes are added to or removed from part of the system or when a change occurs such as a malfunction or a change in location, a flexible response is made and efficient data communication is maintained.

Fourth Embodiment

Next, a fourth embodiment of the present invention will be described. The nodes in the fourth embodiment have the same structure as in the first embodiment, shown in FIG. 2, but the impulse signal transmitter 13 and data communication unit 15 use different frequency bands. Accordingly, the impulse signal transmitter 13 and data communication unit 15 cannot share transmitting circuitry to the same extent as in the first embodiment; a separate carrier signal must be generated and modulated for each frequency band.

Operations in the fourth embodiment that differ from operations in the first embodiment will be described below.

Since the output impulse signal Sout11 and the output data signal Sout12 are transmitted in different frequency bands in the fourth embodiment, these two signals do not have to be transmitted at separate times. The time slot used to transmit the output data signal Sout12 in the data communication unit 15 therefore starts at the transmission timing of the output impulse signal Sout11, and terminates at a timing preceding the generation of the closest received impulse signal Spr11. This condition can be satisfied by transmitting the output data signal Sout12 in a time slot in which the value $\theta_i(t)$ of the phase signal Spr12 satisfies the following condition.

$0 < \theta_i(t) < \beta_1 - \delta_2$

The meaning of the symbols in the above condition is the same as in the first embodiment, and it is assumed, as in the first embodiment, that the output impulse signal Sout11 is transmitted when the phase signal Spr12 indicates zero phase, that is, when $\theta_i(t)=0$.

The fourth embodiment provides the same effects as the first embodiment. In addition, since the fourth embodiment enables the output impulse signal Sout11 and output data signal Sout12 to be transmitted at overlapping times, it is possible assign wider time slots for the transmission of the output data signal Sout12 than in the first embodiment. This enables the fourth embodiment to continue stable operation at higher data traffic rates than in the first embodiment.

Fifth Embodiment

Next, a fifth embodiment of the present invention will be described. The nodes in the fifth embodiment have the same structure as in the first embodiment, shown in FIG. 2, except that the data communication unit 15 assigns quantified priority levels to the data it transmits, and the communication timing controller 12 dynamically controls the value of the natural angular frequency parameter ω (the basic transmission rate) at its own node, according to the quantified priority level. The priority level may represent, for example, a level of necessity, activity, urgency, or the like, and may also be related to the amount of data to be transmitted.

The fifth embodiment adds the following operations to the operations described in the first embodiment with regard to the communication timing calculations (step 3-3 in FIG. 3). Other operations in the fifth embodiment are the same as in the first embodiment.

In step 3-3, the data communication unit 15 quantifies the priority level of the data it receives and notifies the communication timing controller 12 of the priority level. The received data may be the observation data Spr15 received from the sensor 16, or data received from a neighboring node or by human intervention. A quantified priority level is generated each time the data communication unit 15 receives data to be transmitted.

The priority level may be determined from the type, content, attributes, quantity, and other properties of the data to be transmitted. Basically, the priority level represents the urgency with which the data must be transmitted. One exemplary way to generate a quantified priority level is to use a predetermined rule that assigns different priority weights to different types of data, and multiply the amount of data to be transmitted by the priority weight. If the data to be transmitted include several different types of data, a weighted sum may be taken.

The communication timing controller 12 dynamically controls the value of the natural angular frequency parameter ω (the basic rate) according to the quantified priority level. In one exemplary scheme, the natural angular frequency parameter ω is allowed to take on values that are integer multiples of a reference value equal to a predetermined minimum angular frequency. The minimum angular frequency may be determined experimentally according to the application or other system conditions. The reference value is assigned to the natural angular frequency parameter ω when the data communication unit 15 reports the lowest quantified priority value, and higher integer multiples are assigned for higher quantified priority values. As the quantified priority value increases, the natural angular frequency parameter ω increases in a series of steps.

In another exemplary scheme, the values of the natural angular frequency parameter ω are not limited to exact integer multiples of a reference frequency but may also be values in a predetermined vicinity of an integer multiple of the reference frequency.

In yet another exemplary scheme, each node has a quantified priority level that changes over time, so that ω is a function of time.

Regardless of the scheme used, uniform rules for controlling the value of ω are set in advance throughout the system. If the values of ω are mutually related by integer ratios or near-integer ratios, then even if different neighboring nodes have different values of ω, a steady state can be reached and maintained in which the timings of the output impulse signals Sout11 transmitted by neighboring nodes are appropriately distanced from one another and data collisions are avoided as in the first embodiment.

The fifth embodiment provides the same effects as the first embodiment, with the further effect that neighboring nodes need not share transmission time on an equal basis; nodes with relatively more urgent needs to transmit data can receive larger shares of transmission time.

In a variation of the fifth embodiment, the value of ω is controlled on the basis of the processing power of the node instead of the urgency of the data to be transmitted. In this variation, each node has a fixed value of ω, but among neighboring nodes, nodes with higher processing power obtain a relatively large proportion of the data communication time. More generally, the value of ω can be controlled according to any prescribed property of the nodes.

It is also possible to control the value of ω dynamically on the basis of network traffic conditions, or by taking a plurality of factors, such as both the transmission priority level and the processing capabilities of the node, into consideration.

The fifth embodiment maintains the effects of the first embodiment, but enables transmission time to be assigned to neighboring nodes in unequal shares by allowing one node to use more time slots than another. That is, one node may receive more opportunities to transmit than another node.

The fifth embodiment also allows the number of time slots used by each node to be adjusted autonomously, based on priority and various other factors such as individual node characteristics and network conditions, without requiring centralized control.

The fifth embodiment is particularly useful in networks that transmit different types of data with different degrees of urgency. Efficient communication in such networks requires that data having a relatively high level of urgency be transmitted with higher priority than data having a relatively low level of urgency. The fifth embodiment enables urgent data to be transmitted efficiently even when the network is congested, thereby enhancing the usefulness of the network for communication.

Sixth Embodiment

Figure 9:
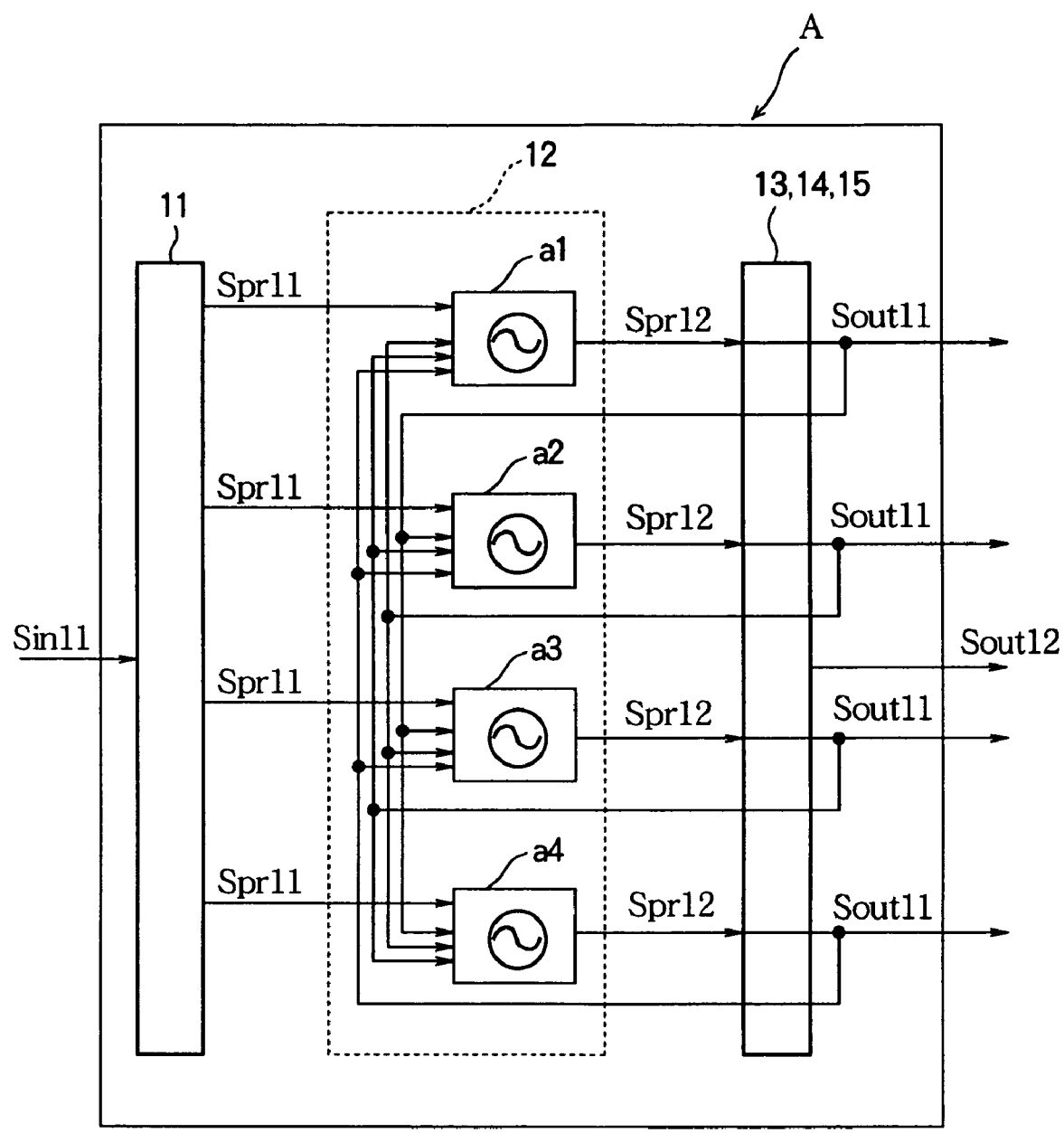
FIG. 9 is a block diagram showing the internal structure of a node according to a sixth embodiment of the invention.

Next, a sixth embodiment of the present invention will be described. The nodes in the sixth embodiment have the same structure as in the first embodiment, shown in FIG. 2, except that the communication timing controller 12 has a plurality of state variable signal generating units, each receiving the received impulse signal Spr11 and generating an independent phase signal Spr12 to determine the transmission timing of an output impulse signal Sout11. For example, the communication timing controller 12 may include four state variable signal generating units a1 to a4 as shown in FIG. 9. The impulse signal transmitter 13, steady-state decision unit 14, and data communication unit 15 are shown for convenience in this drawing as a single functional block receiving the phase signals Spr12 from all four state variable signal generating units 1a to a4.

The state variable signal generating units may operate according to the model given by the equation (1) given in the first embodiment, or various other models.

The operation of the sixth embodiment is basically similar to the operation of the first embodiment, except that the state variable signal generating units in the communication timing controller 12 operate in parallel. Each state variable signal generating unit uses the received impulse signal Spr11 to calculate phase values $\theta_i(t)$ by, for example, solving equation (1) in the first embodiment. The calculated phase values $\theta_i(t)$ are supplied independently from the four state variable signal generating units a1, a2, a3, a4 to the impulse signal transmitter 13, steady-state decision unit 14, and data communication unit 15 as phase signals Spr12.

For simplicity, it will be assumed below that the value of the proper angular oscillation parameter ω is the same in each state variable signal generating unit. The value of ω may be fixed for the whole system, as in the first embodiment. The fifth embodiment can also operate, however, in a mode permitting the value of ω to differ between different nodes, or between different state variable signal generating units in the same node.

The impulse signal transmitter 13 transmits an output impulse signal Sout11 each time the phase signal Spr12 received from any one of the state variable signal generating units takes on a specific value $\theta_i(t)=\alpha$ ($0 \leq \alpha < 2\pi$). The same output operation is performed in the same way in response to all of the phase signals Spr12 output from the state variable signal generating units. The output impulse signals Sout11 are both transmitted to the outside world (to other nodes) and fed back to the communication timing controller 12.

The feedback of the output impulse signals Sout11 is used when the state variable signal generating units in the communication timing controller 12 calculate the phase $\theta_i(t)$. More specifically, each state variable signal generating unit calculates the phase $\theta_i(t)$ not only from the received impulse signal Spr11, but also from the output impulse signals Sout11 generated by the other state variable signal generating units' phase signals Spr12. These output impulse signals Sout11, like the received impulse signal Spr11, are represented by the term $P_k(t)$ in the equation (1) shown in the first embodiment.

The steady-state decision unit 14 selects one of the four phase signals Spr12 that are input in parallel, and uses the selected phase signal Spr12 as a time base. The decision calculations described in the first embodiment are repeated at intervals equal to the period of the selected phase signal Spr12. A hypothetical received impulse signal Spr11 is assumed to have been received when the phase of each non-selected phase signal Spr12 takes on a specific value $\theta_i(t)=\alpha$ ($0 \leq \alpha < 2\pi$). This enables the communication timing controller 12 to reach a steady state in which the output impulse signals Sout11 generated on the basis of the phase signals Spr12 output by the plurality of state variable signal generating units and the received impulse signals Spr11 received from the outside world are stabilized in an appropriately separated temporal relationship. In the steady state, each period of any one of the phase signals Spr12 output by the state variable signal generating units includes a plurality of transmission timings of output impulse signals Sout11, and these transmission timings are related so that they do not collide either with the transmission timings of the other output impulse signals Sout11 or with the reception timing of the received impulse signal Spr11.

The data communication unit 15 transmits the output data signal Sout12 in time slots related to the timing of transmission of the output impulse signals Sout11 as in the first embodiment. A plurality of time slots are obtained within each period of the phase signals Spr12, the number of time slots per period being equal to the number of state variable signal generating units.

The sixth embodiment can be viewed as operating as if each node comprised a plurality of internal sub-nodes interacting mutually through their output impulse signals Sout11, as well as interacting with neighboring nodes in the outside world. Each sub-node obtains its own time slots; consequently the node as a whole obtains a plurality of time slots within each period of the phase signal Spr12.

The number of sub-nodes, that is, the number of state variable signal generating units, may differ from one node to another. The number of sub-nodes operating in a node may depend on the processing capability of the node, or on other node properties. The number of sub-nodes may also be controlled dynamically on the basis of, for example, a quantified priority level or one or more other factors as described in the fifth embodiment. In any case, the more sub-nodes there are operating in a given node at a given time, the more time slots that node receives.

The sixth embodiment accordingly enables time slots to be apportioned among neighboring nodes on an unequal basis. As in the fifth embodiment, nodes with greater processing power or more urgent transmission needs can receive more time slots than nodes with less processing power or less urgent transmission needs. Adjustment of the relative positions of the time slots so as to avoid data collisions remains autonomous, and adjustment of the number of time slots can also be made autonomous. For example, each node can operate a number of state variable signal generating units (sub-nodes) proportional to the quantized priority level of the data it has to transmit. The number of sub-nodes can also be adjusted according to network conditions.

The sixth embodiment accordingly provides effects similar to those provided by the fifth embodiment, by varying the number of state variable signal generating units instead of varying the natural angular frequency parameter ω.

The sixth embodiment is particularly effective in increasing the functional performance of a hybrid mixed network in which nodes of different types, such as nodes with different functions or processing capabilities, communicate with each other.

In a variation of the sixth embodiment, the phase signal Spr12 output from each state variable signal generating unit a1, a2, a3, a4 is fed back to other state variable signal generating units in the communication timing controller 12, instead of using feedback of the output impulse signal Sout11. Since the phase of the output impulse signal Sout11 is determined by the value of the phase signal Spr12, the calculations performed by the state variable signal generating units a1, a2, a3, a4 remain essentially the same.

Seventh Embodiment

Figure 10:
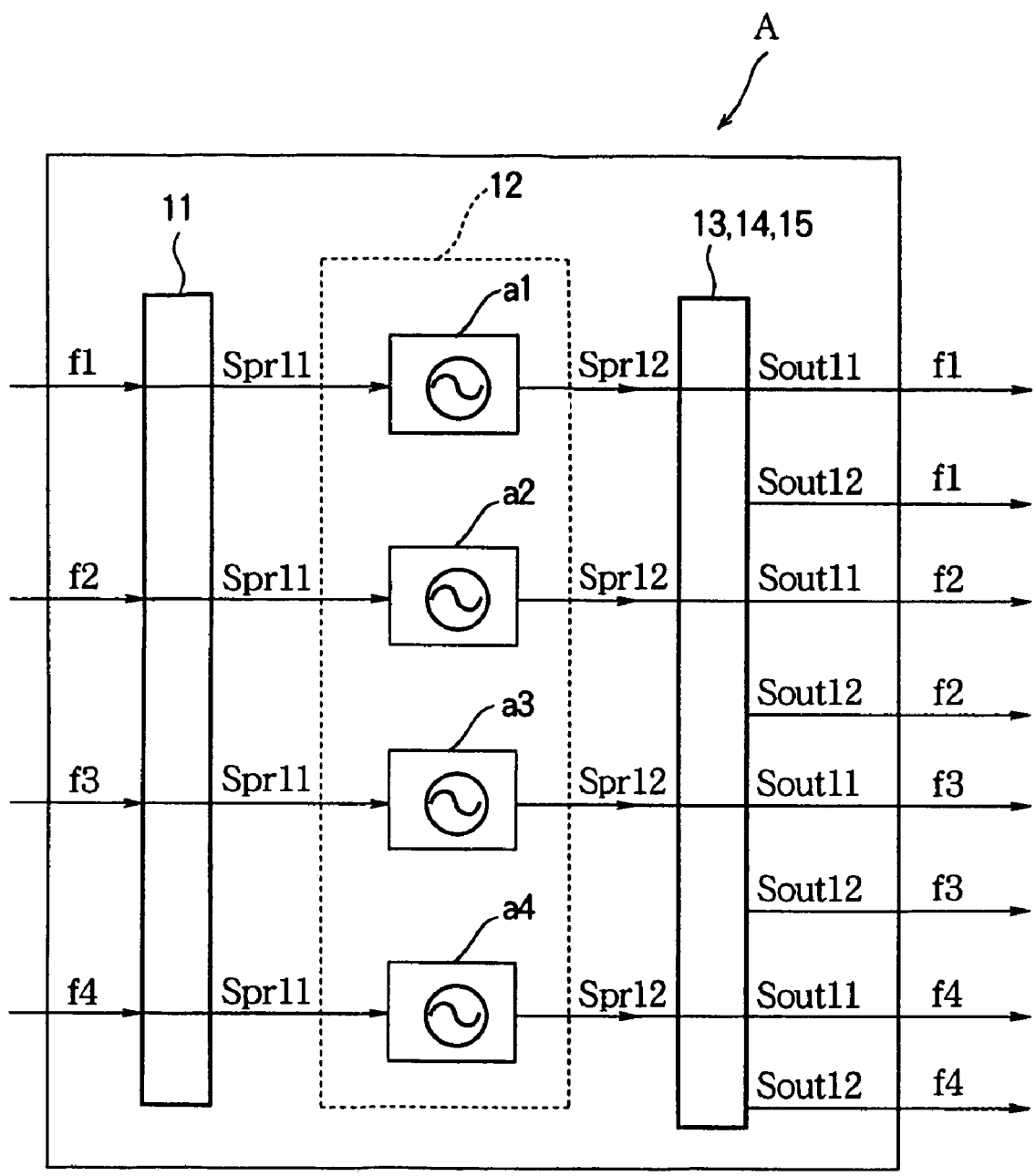
FIG. 10 is a block diagram showing the internal structure of a node according to a seventh embodiment of the invention.

Next, a seventh embodiment of the invention will be described. The nodes in the seventh embodiment have the same structure as in the first embodiment, shown in FIG. 2, except that the communication timing controller 12 has a plurality of state variable signal generating units, as in the sixth embodiment. In the following description, the communication timing controller 12 has four state variable signal generating units a1 to a4 as shown in FIG. 10. Each of the state variable signal generating units operates similarly to the communication timing controller 12 in the first embodiment, generating a phase signal Spr12.

In the seventh embodiment, the impulse signal transmitter 13 transmits output impulse signals Sout11 in four mutually distinguishable frequency bands. Output impulse signals transmitted at timings calculated by the first state variable signal generating unit a1 are transmitted in a first frequency band f1; output impulse signals transmitted at timings calculated by the second, third, and fourth state variable signal generating units a2, a3, a4 are transmitted in respective frequency bands f2, f3, f4. The output impulse signals Sout11 are not fed back to the state variable signal generating units a1, a2, a3, a4.

The data communication unit 15 transmits output data signals Sout12 in these same frequency bands f1, f2, f3, f4, depending on the state variable signal generating unit that calculated the output timing. Output data signals Sout12 transmitted at timings derived from the phase signal Spr12 received from the first state variable signal generating unit a1, for example, are output in the first frequency band f1.

The impulse signal receiving unit 11 and the data communication unit 15 receive input impulse signals Sin11 and input data signals Sin12 in the same four frequency bands f1, f2, f3, f4, using bandpass filters or other appropriate means to separate the signals received in different frequency bands.

In the seventh embodiment, accordingly, each node operates as if it comprised a plurality of sub-nodes, each sub-node operating in a different frequency band. Since the sub-nodes communicate in different frequency bands, they can transmit simultaneously, making it possible to increase the traffic capacity of the node.

The seventh embodiment provides substantially the same effects as the first and sixth embodiments, but greatly increases the traffic capacity of the network by using multiple frequency bands.

Next, several variations of the preceding embodiments will be described

First Variation

In the embodiments described above, each node interacts only with its neighboring nodes, but the invention is not limited to interactions with neighboring nodes. There may be one or nodes that interact with all other nodes in the network. That is, the network may include both locally interacting nodes and globally interacting nodes.

Second Variation

Equation (1) was used in the processing in the communication timing controller 12 described in the first embodiment. In this processing, random variability is introducing by a random variable φ(t) into the phase response function, but random variability can also be introduced by adding φ(t) directly to the natural angular frequency ω, as follows.

$$d\theta_i(t)/dt = \omega + \phi(t) + \sum_{k=1}^{N} P_k(t) \cdot R(\theta_i(t))$$

$$R(\theta_i(t)) = \sin(\theta_i(t) + \pi)$$

$\theta_i(t)$: phase signal of node i
ω: natural angular frequency parameter
$P_k(t)$: received impulse signal from node k
$R(\theta_i(t))$: phase response function
φ(t): random noise function Third Variation In the preceding embodiments, each node had a sensor and transmitted observation data Spr15 obtained from the sensor 16 as the output data signal Sout12. As a variation of any of the preceding embodiments, the node may transmit data obtained by performing a computational operation on the observation data Spr15. As a further variation, the sensor may be dispensed with; the output data signal Sout12 may be the result of a computational process performed on the input data signal Sin12, the value of a variable indicating an internal state of the node, the result of a computational process performed on one or more internal state variables, data input by a manual operation, or any other type of data.

Fourth Variation

In the preceding embodiments, the output impulse signal Sout11 was transmitted regardless of the presence or absence of data to be transmitted. As a result, time slots were reserved even for nodes not generating data traffic. In a variation of the preceding embodiments, only nodes that generate traffic transmit the output impulse signal Sout11. By eliminating unused time slots, this variation increases the traffic capacity of the network. As the nodes generating traffic change over time, time slots are reassigned by autonomous cooperation among the nodes currently generating traffic.

Fifth Variation

A differential equation (1) was used to describe the processing performed by the communication timing controller 12 in the first embodiment, but other types of equations can be used instead. One example is a difference equation or recursion formula obtained by changing the continuous time variable t in equation (1) to a discrete time variable as shown below.

In the equation below, n is a discrete time variable taking on positive integer values. The other symbols have the same meanings as in the first embodiment, except that they are all functions of the discrete time variable n. The quantity $\Delta t$ indicates the step width of discrete time. The continuous time variable t and the discrete time variable n are related by $\Delta t$ (more specifically, $t = n \cdot \Delta t$)

$$\theta_i(n+1) = \theta_i(n) + \left[\omega + \sum_{k=1}^{N} P_k(n) \cdot R(\theta_i(n), \sigma(n))\right] \cdot \Delta t$$

$$R(\theta_i(n), \sigma(n)) = \sin(\theta_i(n) + \sigma(n))$$

$$\sigma(n) = \pi + \phi(n)$$

$$n = 0, 1, 2, \ldots$$

$\Delta t$: discrete time step width

In the equation above, only the time axis is treated in discrete steps, but it is also possible to have the state variables take on discrete values. That is, the state variables can be quantized. In the present case, the phase signal $\theta_i(t)$ is quantized and takes on M discrete values, where M is a positive integer. In the equation below, quantization is expressed by a quantizing function quan(*) that converts an arbitrary continuous quantity (*) to an integer by dividing the quantity by a quantization step width w and ignoring the remainder. The quantization step width w is equal to the dynamic range of the quantity (*) divided by M. For the phase signal $\theta_i(t)$, the quantization step width w is equal to $2\pi/M$.

$$\theta_i(n+1) = \theta_i(n) + \text{quan}\left(\left[\omega + \sum_{k=1}^{N} P_k(n) \cdot R(\theta_i(n), \sigma(n))\right] \cdot \Delta t\right)$$

$$R(\theta_i(n), \sigma(n)) = \sin(\theta_i(n) + \sigma(n))$$

$$\sigma(n) = \pi + \phi(n)$$

$$n = 0, 1, 2, \ldots$$

$\Delta t$: discrete time step width

Sixth Variation

In the preceding embodiments, neighboring nodes interact by sending output impulse signals Sout11 at discrete intervals, but the nodes can also interact by sending a continuous state variable signal. The equation (1) used in the first embodiment should then be modified as shown below.

In the equation below, the i-th node transmits its own phase signal $\theta_i(t)$ continuously to the neighboring nodes, and receives their phase signals $\theta_k(t)$. As in the first embodiment, there are assumed to be N neighboring nodes, and k takes on values from one to N. The mutual interactions take place continuously, as the phase signals are received and processed continuously. The variable C in the equation below is a constant parameter. The other symbols have the same meanings as in the equation (1) in the first embodiment.

$$d\theta_i(t)/dt = \omega + \frac{C}{N}\sum_{k=1}^{N} P_k(t) \cdot R(\theta_k(t), \theta_i(t), \sigma(t))$$

$$R(\theta_k(t), \theta_i(t), \sigma(t)) = \sin(\theta_k(t) - \theta_i(t) + \sigma(t))$$

$$\sigma(t) = \pi + \phi(t)$$

Although time and phase are treated as continuous variables in the equation above, it is possible to treat time and/or phase in discrete steps, as in the fifth variation. The modifications described in the second embodiment and the second variation above can also be made, and further modifications, including modifications of the underlying nonlinear oscillation model, are also possible as mentioned in the first embodiment. For example, it is possible to use the well-known van der Pool equation, which models nonlinear oscillatory phenomena in electronic circuits. Although this model can be incorporated into the present invention by providing hardware circuits that actually exhibit the modeled oscillations, the model can also be incorporated in software by using general methods of numerical analysis, such as the Runge-Kutta method.

The van der Pool equation and other general models of nonlinear oscillation or non-chaotic oscillation can be used regardless of whether the mutual interactions between nodes take place continuously or at discrete intervals, and regardless of whether time is treated as a continuous or discrete variable. The present invention does not depend on any particular model of oscillation, or any particular mathematical form of expression of the model.

Seventh Variation

In the preceding embodiments, the neighboring nodes interacted by wireless communication, but the invention is not limited to wireless communication. The invention can also be practiced in a system in which a number of spatially distributed nodes exchange data over wires. For example, the invention can be applied to a wired local area network (LAN), a wired server-client network, a wired network including sensor nodes, actuator nodes, and controller nodes, or a network in which wired connections and wireless connections are mixed.

The present invention can also be used as a communication protocol for exchanging routing tables between routers at different timings on the Internet. A router is a relay node device that routes information to its destination on a network by selecting communication paths. A routing table is essentially a communication path selection rule referred to when the information is routed. To achieve efficient communication, it is necessary to keep updating the routing tables in response to changes in network topology, local traffic conditions, and so on. Each router therefore periodically transmits routing table information to the other routers in the network.

As shown by Floyd et al. in "The Synchronization of Periodic Routing Messages", *IEEE/ACM Transactions on Networking*, Vol. 2, No. 2, pp. 122-136, April 1994, even though different routers transmit their routing tables independently, these transmissions have a tendency to become mutually synchronized. Floyd et al. propose a method of avoiding synchronization by imposing random variability on the period between routing table transmissions, and this method is shown to produce some effect. Because the method depends only on randomness, however, an undesirably high degree of randomness is required.

If the present invention is applied to the transmission of routing tables, neighboring routers can adjust the time slots in which they transmit routing tables autonomously among themselves, so that different routers transmit routing tables at different times. Because the routers actively avoid each other's time slots, the method of the present invention achieves a greater effect than the method proposed by Floyd et al., while requiring less randomness.

The transmission of routing tables is only one example of the type of transmission of data at periodic intervals to which the present invention is applicable. The invention can be used to avoid collision or synchronization in all types of networks, whether wireless or wired, and it can be used as a communication protocol for achieving efficient data communication possessing with both adaptability and stability.

When the object is to avoid synchronization, the functional components of a single node may be disposed at physically separate locations, and separated functional elements may be interconnected by the network.

Eighth Variation

Instead of transmitting data pulse signals as in the third embodiment, or separate data signals and impulse signals as in the other embodiments, neighboring nodes may interact simply by transmitting data. The data signals received from other nodes can be processed in the communication timing controller 12 by using equation (1) as in the first embodiment, by generating internal impulse signals in synchronization with the start of reception. Data signals are transmitted at the timings calculated by the communication timing controller 12. The steady state is reached when the neighboring nodes start transmitting data at mutually separated timings. Each data transmission ends before the start of the next transmission from a neighboring node. Meaningful data are transmitted in the steady state; dummy data are transmitted in the transitional state leading to the steady state. Dummy data may therefore collide, but loss of meaningful data is avoided.

Those skilled in the art will recognize that further variations are possible within the scope of the invention, which is defined in the appended claims.

What is claimed is:

1. A node used as a first node in a communication system that also includes at least a second node, the first node comprising:
    a signal communication unit operable to transmit a first state variable signal to the second node and receive a second state variable signal from the second node, the first state variable signal indicating a first operating timing of the first node, the second state variable signal indicating a second operating timing of the second node; and
    a timing decision unit operable to generate the first operating timing periodically at a basic rate subject to temporary variations, to generate the first state variable, and to adjust the first operating timing so that the first operating timing and the second operating timing are distanced from each other by varying the basic rate according to a rule that makes the first operating timing and the second operating timing mutually repulsive.

2. The node of claim 1, wherein the timing decision unit also varies the basic rate randomly.

3. The node of claim 1, wherein the timing decision unit determines the basic rate according to a processing capability of the first node.

4. The node of claim 1, further comprising a data communication unit for transmitting data at a timing determined from the first operating timing wherein and the timing decision unit determines the basic rate according to a priority of the data to be transmitted.

5. The node of claim 4, wherein the timing decision unit sets the basic rate to a value substantially equal to an integer multiple of a reference value.

6. The node of claim 4, wherein the timing decision unit increases the basic rate as the priority increases.

7. The node of claim 1, further comprising:
    a steady-state decision unit for deciding whether a steady-state relationship exists between the first operating timing and the second operating timing; and
    a data communication unit for transmitting data at a timing determined from the first operating timing when said steady-state relationship exists.

8. The node of claim 7, wherein the first state variable signal has a first transmission range controlled by the signal communication unit, the data have a second transmission range controlled by the data communication unit, and the first transmission range differs from the second transmission range.

9. The node of claim 1, wherein the timing decision unit includes a plurality of calculation units each generating a separate first state variable signal.

10. The node of claim 9, wherein the number of calculation units in the timing decision unit depends on a processing capability of the first node.

11. The node of claim 9, further comprising a data communication unit for transmitting data from the first node at timings determined from the first operating timing, wherein the number of calculation units in the timing decision unit depends on a priority of the data to be transmitted.

12. The node of claim 9, wherein the first state variable signals generated by the calculation units indicate different first operating timings.

13. The node of claim 9, wherein the first state variable signals generated by the calculation units are transmitted in different frequency bands.

14. The node of claim 13, further comprising a data communication unit for transmitting data from the first node at timings determined from the first operating timings, in the frequency bands in which the first state variable signals that indicate the first operating timings are transmitted.

15. A communication system comprising a plurality of nodes of the type described in claim 1.

16. A method of controlling a first node and a second node in a network, comprising:
    transmitting a first state variable signal from the first node to the second node, the first state variable signal indicating a first timing related to a first periodic operation performed at the first node;
    transmitting a second state variable signal from the second node to the first node, the second state variable signal indicating a second timing related to a second periodic operation performed at the second node;

controlling the first timing autonomously at the first node so as to distance the first timing from the second timing;

controlling the second timing autonomously at the second node so as to distance the second timing from the first timing;

transmitting data from the first node at a timing determined from the first timing; and transmitting data from the second node at a timing determined from the second timing.

17. The method of claim 16, further comprising deciding whether a steady-state relationship exists between the first timing and the second timing, wherein said data are transmitted from the first node and the second node only when the steady-state relationship exists.

18. The method of claim 16, wherein controlling the first timing further comprises:

determining a basic rate of the first periodic operation; and varying the basic rate according to a rule that makes the first timing and the second timing mutually repulsive.

19. The method of claim 18, wherein controlling the first timing further comprises randomly varying the basic rate.

20. The method of claim 18, wherein the first operation includes transmitting data from the first node, and determining the basic rate comprises assigning a priority to the data to be transmitted, the basic rate being determined from the priority.

21. A machine-readable medium storing a program for controlling a first node in a network including at least the first node and a second node, the program including instructions for:

receiving from the second node a state variable signal indicating a second timing of a second periodic operation performed at the second node;

generating a first timing periodically at the first node, at a basic rate subject to temporary variations;

adjusting the first timing so that the first timing and the second timing are distanced from each other by varying the basic rate according to a rule that makes the first timing and the second timing mutually repulsive;

performing a periodic operation at the first node responsive to the first timing; and transmitting to the second node a state variable signal indicating the first timing.

* * * * *